INVENTORS
GEORGE CONSTABARIS
BERNARD F. MULASKEY
ROBERT H. LINDQUIST
THOMAS G. CHIN

3,255,122
CONTROL OF SURFACE AREA IN A CATALYST MANUFACTURING PROCESS

George Constabaris, Berkeley, Bernard F. Mulaskey, Richmond, Robert H. Lindquist, Berkeley, and Thomas G. Chin, El Cerrito, Calif., assignors to Chevron Research Company, a corporation of Delaware
Filed Jan. 2, 1962, Ser. No. 166,448
3 Claims. (Cl. 252—449)

The present invention relates to a process for the determination of surface areas of porous materials and pertains more particularly to an improved method for the rapid determination of surface areas of high surface area catalysts.

The geometric surface of heterogeneous catalytic materials is one of their fundamental extensive properties. For a specific catalyst, an increase in activity per unit weight generally follows an increase in unit area. Sometimes this activity is desirable, in others it is not. Also process conditions cause loss of area on catalyst. The determination of surface areas is thus of great importance in both production and use of catalysts. Thus, in the production of catalysts, any increased speed in the measurement of the surface area is of great economic advantage since the sooner the area of the product is known, the sooner the operating conditions can be adjusted to minimize the amount of poor catalyst produced. Likewise, in the use of the catalyst where process conditions are causing the loss of desired catalyst activity by reduction of surface area, the quicker this is known, the sooner the process conditions can be changed to correct and offset the lowered catalyst activity.

Most prior methods of determining surface areas require elaborate equipment, skilled operators, and usually take a considerable amount of time to determine the surface area of one sample. Thus, the method of Brunauer, Emmett and Teller, the so-called BET method (J. Am. Chem. Soc., 60, 309 (1938)) takes one to several hours per sample analyzed and requires an elaborate glass apparatus with manometers, heaters and vacuum pump.

Therefore, it is an object of the present invention to provide a method for determining surface area of porous solids. A further object is to provide a method of obtaining indications as a function of the surface area, and which indications can be used to control catalyst manufacture or to adjust operating conditions in a catalytic conversion process in response to changes in surface area of the catalyst. The new surface area indicating method is based on an entirely different phenomena than that applied in the BET method. It has the particular advantage of being able to yield surface area in a relatively short period such as 5 minutes for each dried sample. The equipment for carrying out the method can be relatively simple. Also, the method does not require complex calculations or electronic data processing apparatus for determining the surface area.

Preferably, the method of the present invention is carried out by applying a pressure gas displacement technique to determine apparent and true skeletal density of the sample of high area porous solid. The method involves the steps of measuring the change in variable volume of a chamber containing the sample when gas is adsorbed on the catalyst surface and then measuring the same sample when adsorption is prevented from taking place. Gas adsorption can be prevented by covering the sample with the known volume of water or by using as a second gas a nonadsorbing gas such as helium. Where a nonadsorbing gas is used, the two measurements can be carried out in any order.

In our method, the basic principle is different, although superficially similar to that used in the BET method. While the BET method depends upon the use of a gas at a temperature at which it will condense onto the surface until the surface is covered, thereby giving an inflection point on the adsorption isotherm, the present method uses gas at a temperature above the critical condensation temperature of the gas. The effect of the solid in contact with the gas is to introduce an imperfection into the gas. The effect of the force field contributed by the solid is an apparent shrinkage, i.e., the imperfection, of the gas in the presence of the high area solid. Hence, gas molecules are concentrated near the solid surface by the force field, and the apparent gas shrinkage is directly proportional to the area of the solid. Therefore, the present method is based upon the apparent shrinkage of the gas in contact with the surface area of the sample being tested. However, since a process is more readily described by use of the more familiar terms of adsorption, such terms are used to describe the process. The amount of gas that "disappears" which can be called the volume per unit weight adsorbed, "$V_{STP}$," is given by:

Equation (1)

$$V_{STP} = \text{Area} \times \begin{cases} \text{Constant X} \\ \text{Pressure X} \\ \text{Function of temperature and nature of the surface} \end{cases}$$

at constant temperature, pressure and with the same type of surface, this expression reduces to:

$$V_{STP} = \text{Constant} \times \text{Area}$$

In order words, the measured $V_{STP}$ (i.e., the volume of gas which disappears) is a function of the surface area. For a particular type of surface, the constant can be obtained under fixed conditions of temperature and pressure. This is done by measuring the true surface area for the selected type of material, such as by use of the BET method, and obtaining the proportionality factor, which is the constant for that material. Thus, for other samples of the same type, this constant multiplied into the measured $V_{STP}$ gives the area.

Figure 2:
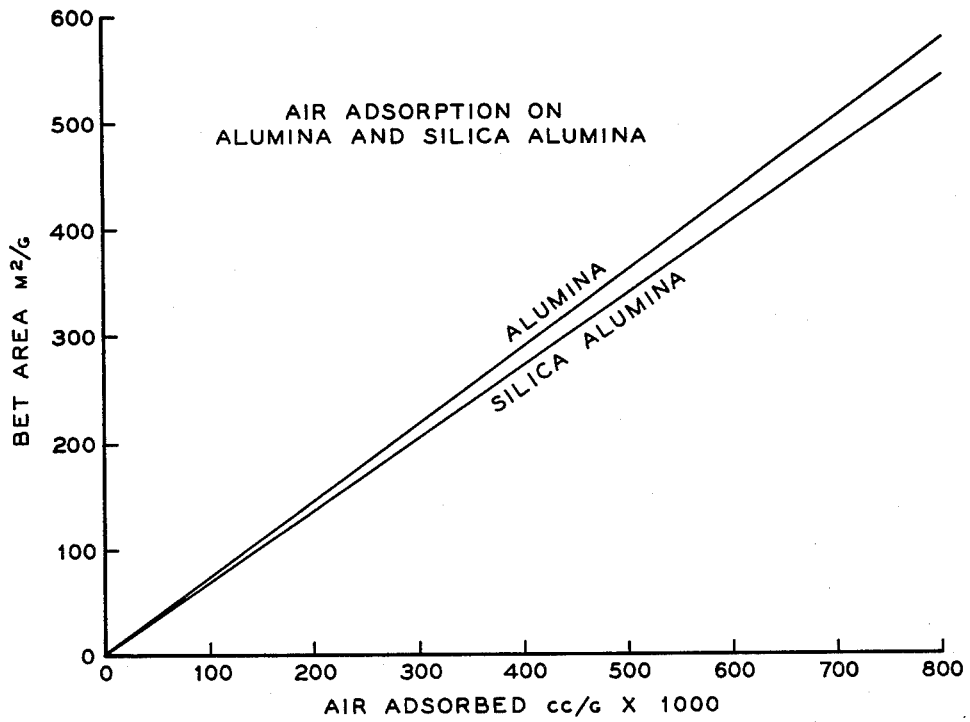
FIG. 2 is a graph showing for a series of alumina samples and a series of silica-alumina samples the relationship between the values obtained by the above method and surface areas as measured by the BET method.

The present method is most conveniently carried out, and is illustrated with reference to the drawing, by using a system containing a working cylinder 1 and a reference cylinder 2 of the same volume fitted with pistons 3 and 4 of the same cross section. The cylinders are connected by a valved line 5 to equalize the pressure at the beginning of the measurement and means such as a differential manometer 6 between the two cylinders to determine when the pressure is the same in both cylinders.

A convenient instrument for carrying out these measurements is a device marketed by Beckman Instruments as an "Air Pycnometer" for the purpose of measuring the volumes of irregular solids. Usually, this instrument is provided with stops in both the sample and reference cylinders, such as stop 7 in reference cylinder 2 shown in the drawing. Since, in the method of the present invention, apparent negative volumes are sometimes obtained, the Beckman instrument can be modified by omitting the stop on the sample piston travel so that counter 11 (referred to below) can be turned to yield numbers prefaced with a negative sign. If the stop on the sample piston travel is not omitted, the counter 11 can be set to read high by a fixed number, which number is then subtracted from the counter reading. Alternately, a solid object such as a glass stopper or a steel ball of known volume can be placed in the working cylinder, which volume is subtracted from the counter reading. These variations avoid the need for negative numbers on the counter but apparent volumes having negative numbers are obtained with the very high surface area materials.

At the start, the pistons 3 and 4 are in position A. A dried and weighed sample 10 is put in the working cylinder and the valves opened to insure that the same pressure $P_i$, is in each. After the valve is closed, the piston in the reference cylinder is pushed to C which raises the pressure to $P_f$. If C is located so that the volume is halved, then $$P_f = 2P_i$$

The piston in the working cylinder is then moved to Point B which is indicated by a zero reading on the differential manometer 6.

From the location of the piston at B, the volume, $V_s$, of the sample 10 can be found by taking a material balance in the working cylinder before and after compression. The balance may be written in terms of the number of moles of gas in the cylinder.

$$\frac{P_i V_i}{RT} = \frac{P_f V_f}{RT}$$

Where $i$ is for initial conditions and $f$ final conditions, and RT is the gas constant times the temperature.

Now, if no adsorption occurs:

$$V_i = V_1 - V_s$$

$$V_f = \frac{V_1}{2} - V_s + V_x$$

Where $V_x$ is the volume between the halfway point C and B. By substitution, it is found $$V_s = 2 V_x$$

A counter 11 on the piston 3 is geared so that the readout is twice $V_x$ and, therefore, gives $V_s$ directly.

The equations above are simply modified when adsorption takes place so that the amount of gas adsorbed may be written as:

$$V_{STP} = K \times A \times P$$

Where K is a constant, A the area, and P the pressure. $V_{STP}$ may be converted to a number of moles, $N_{STP}$, by dividing by molar volume at the temperature of the measurement:

$$N_{STP} = K'AP$$

Where $K'$ is a new constant. The number of moles before compression is (subscript $i$)

$$\frac{P_i(V_1 - V_s)}{RT} + P_i K' A$$

Similarly, after compression (subscript $f$), the same number of moles is expressed:

$$P_f \left( \frac{V_1/2 - V_s + V_x}{RT} \right) + P_f K' A$$

Equating these expressions, using $P_f = 2P_i$, and taking $1/RTK'$ as a new constant C, we find $$V_x = \frac{V_s}{2} - \frac{A}{2C}$$

but the counter reading—$cr$—is twice $V_x$. Therefore, we have, after rearranging, $$A = C(V_s - cr)$$

This is the basic expression for the surface area indicating method.

The true volume of the solid appears in the above equation as $V_s$. Thus, the second measurement of the process is obtained by repeating the measurement while preventing adsorption of gas by the surface. One convenient way is to cover the sample with an accurately known amount of a wetting liquid before repeating the compression operations. The counter reading minus the volume of liquid is the sample volume $V_s$. Where the true skeletal density is known as in a series of control tests with samples of the same material, the sample volume is readily determined from the sample weight; in such instances, the second measurement (without adsorption) can be omitted. The difference between the skeletal volume and the apparent volume is the volume of gas adsorbed, which is a measure of the surface area and thus can be converted to volume of absorbed gas per unit weight of sample (i.e., in "cc./g." units).

As indicated, the same type of surface with varying areas has substantially the same constant. Hence, once the constant for a type of surface is obtained, such as by reference to the BET method, rapid measurements of surface area for that type of surface can be made. A further refinement can be made by plotting the BET measured surface areas against the cc./g. gas adsorbed obtained as above for a series of samples of the same material but of varying surface areas. The calibrations which plot as straight line functions will have different slopes for different substances. This is shown in FIG. 2.

Greater sensitivity of measurement can be obtained by using higher pressures. Thus, where low areas are measured, which require greater sensitivity, a higher pressure can be used. As Equation (1) shows, a higher final pressure results in a higher $V_{STP}$, which in turn leads to greater accuracy when the same absolute error occurs at the lower pressure.

The samples should be carefully dried and handled to prevent adsorption of water. A suitable procedure is to dry the samples at 900° F. for about 1 hour, preferably 2 hours, then to cool the samples while preventing adsorption of moisture, such as by cooling in a well sealed bottle, and finally to transfer them quickly to the measuring chamber. In general, the times and temperatures of drying will depend upon the nature of the material. Without such drying, large errors occur in the measurement of the volume of gas adsorbed because water has a high specific volume compared to catalyst.

In the above description, air has been used as the adsorbing gas. Other adsorbing gases include $N_2$, $CO_2$, methane and others suitable for the kind of surface area of interest. While helium is usually most convenient for use as a nonadsorbing gas, others such as hydrogen or neon may be used.

Figure 1:
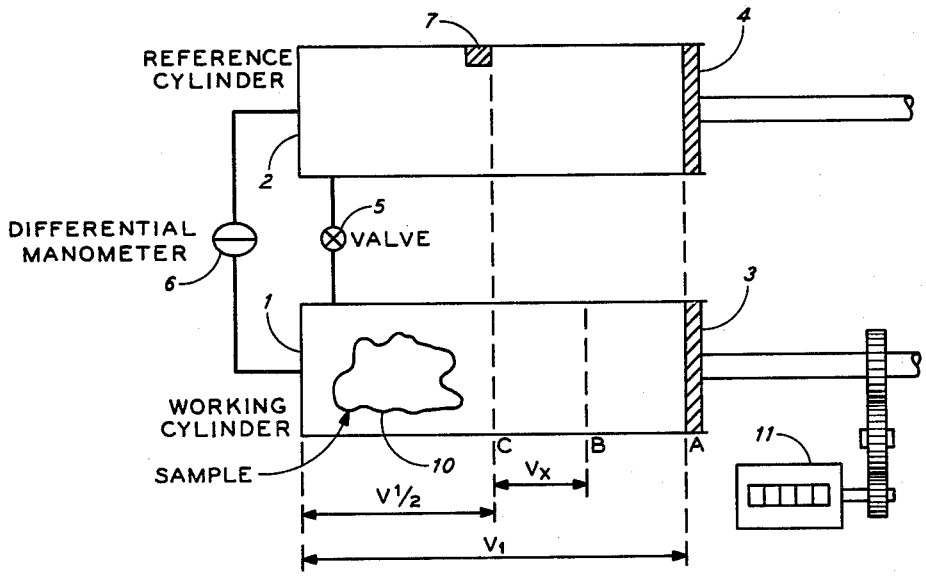
FIG. 1 is a schematic diagram of an apparatus suitable for use in the process of the present invention.

Instead of the above-described apparatus as shown in FIG. 1, the surface area indicating method can be carried out with a single chamber which can be filled with air (or other suitable adsorbing gas above its critical temperature) to a fixed superatmospheric pressure such as 2 atmospheres and provided with volume measuring means such as a wet gas meter through which to discharge, as by release through a valve, the superatmospheric pressure, and thus to measure the gas volume. The method then comprises measuring the volume of the gas discharged, after filling at the fixed superatmospheric pressure and temperature, with the chamber containing the dried weighed sample (to get "$V_A$").

Where, as for example, in a control or check in the manufacture of a catalyst, the same chamber is used each time at a fixed temperature and pressure differential with the same amount of the same type catalyst each time, the volume of gas discharged is a function of the surface area of the catalyst. This can be simply represented as:

$$\text{Area} = V'_{WTM} \times C + B$$

wherein $V'_{WTM}$ is the measured volume of adsorbing gas discharged from the chamber with the sample in place and C and B are constants including factors relating to the type of catalyst, skeletal volume, and the pressure factors. The equation above and the constants therein are derived as follows: measurements made at a constant temperature with an empty chamber of volume $V_E$ at a fixed high pressure, $P_H$, and a fixed low pressure (usually atmospheric pressure), $P_L$, lead to the following expressions for the number of mols of gas (the subscripts H and L being for the high and low pressures):

$$n_H = \frac{P_H V_E}{RT} \text{ and } n_L = \frac{P_L V_E}{RT}$$

The number of mols discharged from the chamber is:

$$n_d = n_H - n_L = \frac{(P_H - P'_L) V_E}{RT}$$

In terms of the reading of a meter, e.g., a wet test meter, measuring the volume of gas discharged, $V_{WTM}$, then $$n_d = \frac{P_L V_{WTM}}{RT}$$

Equating this last expression to the previous expression and solving, one gets:

$$V_E = \left(\frac{P'_L}{P_H - P_L}\right) V_{WTM}$$

Repeating the operations for a known skeletal volume of sample, $V_{SK}$, then the number of mols is the number of mols in the gas space, $V_E - V_{SK}$, plus the number of mols adsorbed, $$P_H \times A \times \frac{K}{RT}$$

where A is the surface area and K is a constant.

Then the number of mols, $n_H$ and $n_L$ at final and initial pressures being:

$$n_H = \frac{P_H}{RT}(V_E - V_{SK} + A \times K)$$

and $$n_L = \frac{P_L}{RT}(V_E - V_{SK} + A \times K)$$

The number of mols discharged $= n'_d = n_H - n_L$ (the prime being used to denote values with the solid, where there may otherwise be confusion). From the previous expressions, $$n'_d = \left(\frac{P_H - P_L}{RT}\right)(V_E - V_{SK} + A \times K)$$

In terms of the meter reading for the discharged gas, $V'_{WTM}$, $$n'_d = \frac{P_L V'_{WTM}}{RT}$$

Then, $$V'_{WTM}\left(\frac{P_L}{P_H - P_L}\right) = V_E - V_{SK} + A \times K$$

Since $P_H$ and $P_L$ are the same in measurements with the chamber empty and with the sample in the chamber, and substituting $$V_{WTM} = \left(\frac{P_L}{P_{H-L}}\right) \text{ for } V_E, \text{ then}$$

$$(V'_{WTM} - V_{WTM})\left(\frac{P_L}{P_H - P_L}\right) + V_{SK} = A \times K$$

From which is obtained:

$$A = K\left[\left(\frac{P_L}{P_H - P_L}\right)(V'_{WTM} - V_{WTM}) + V_{SK}\right]$$

One set of meter readings with a sample of known BET surface area and fixed skeletal volume establish the constant, K, for catalysts of the same type. Since with a fixed apparatus where $P_H$ and $P_L$ are constant, a straight line graph can be prepared to relate $V'_{WTM}$ to BET surface areas. Thus, as stated above, $$V'_{WTM} = A \times C + B$$

The new constant C includes K as well as the pressure factor. The constant B includes the factors relating to skeletal volume and gas meter reading when the chamber is empty. As indicated by the form of the equation, the straight line intercepts the $V'_{WTM}$ coordinate to the right of the origin. The graph permits a meter reading $V'_{WTM}$ on any other sample of the same type catalyst to read from the graph in terms of surface area. However, since $V'_{WTM}$ is a function of surface area, that value can be used to check for changes in surface area.

More generally, the surface area indicating method can be carried out by subjecting a sample of the test relatively high surface area material to exposure to a super-atmospheric pressure of an adsorbing gas above its critical temperature in a closed chamber, usually at a fixed temperature to obtain by comparison with the value obtainable under the same conditions with a nonadsorbing gas an indication of the deviation from the perfect gas law due to the presence of the high surface area material. As indicated above for measurements of volume differences, the measurement made with the adsorbing gas can be compared to a direct measurement on the sample made with a nonadsorbing gas which is a function of the skeletal volume or alternatively can be compared to the skeletal volume measured on a sample immersed in a liquid preventing gas adsorption or to the skeletal volume calculated from the weight of the sample and the skeletal density known for the type of material tested. Restated, the surface area indication is obtained by measuring either the volume differential or pressure differential in a container under the same volume conditions with and without the sample present.

Further, pressure differentials can be used to obtain the indication of deviation from the gas law. For example, instead of measuring the volume of gas directly, the surface area indicating method can be carried out with a chamber provided with means to be adjusted to two absolute volumes, such as in a cylinder with a piston movable from one fixed position (to get $V_1$) to another fixed position (to get $V_2$) at a higher pressure. The two volumes being such that with the chamber empty, the pressure at $V_2$ is of the order of twice the pressure at $V_1$, or some other pressure difference sufficiently high that the deviation in the perfect gas law for the adsorbing gas can be readily measured. A sensitive gauge is attached to measure the pressure in the chamber. The method of measurement then comprises introducing a weighed dried sample into the chamber and measuring the initial and final pressures (i.e., $P_i$ and $P_f$) with the piston at the two positions of $V_1$ and $V_2$. Where the same amount of the same type catalyst is used each time and the temperature and initial pressure are constant, the only variable from measurement to measurement is the final pressure which can be used directly as an indication of change in surface area or converted to BET surface area by reading from a curve defined by the expression:

$$A = K\left[\frac{P_i(V_1 - V_{sk}) - P_f(V_2 - V_{sk})}{P_f - P'_L}\right]$$

wherein A is the surface area, K is a constant related to the particular catalyst type, $P_i$ is the initial pressure (conveniently a constant at 1 atmosphere), $P_f$ is the final pressure, $V_1$ and $V_2$ are the constant initial and final volumes as described above and $V_{sk}$ is the skeletal volume (a constant when using the same amount of the same type catalyst).

The above equation is derived from the equivalency of the number of moles of gas initially, $n_i$, to $n_f$, the number of moles of gas at the final pressure. Then, $$n_i = P_i(V_1 - V_{sk} + K \times A)$$
$$n_f = P_f(V_2 - V_{sk} + K \times A)$$

Hence, $$P_i(V_1 - V_{sk} + K \times A) = P_f(V_2 - V_{sk} + K \times A)$$

Solving for A gives the first expression above which defines the curve for the relation between measured final pressure and the surface area.

In the several above variations, it is preferred to make the measurements at a fixed temperature although corrections for the effect of temperature differences in gas volumes from one measurement can be made, if required.

Further, in the several embodiments described for the method, the apparatus can be provided with suitable known pressure or volume sensing devices fitted for recording. Likewise, where constant weights or volumes are used in a series of measurements on the same material, the value of the skeletal volume of the sample becomes constant. Hence, the measured apparent volume as when using the apparatus of FIG. 1 becomes a function of the surface area of the material under test. In such case, such measured apparent volume or an electrical or pneumatic signal obtained by known devices from such measured apparent volume can be used for control of operations needed to be correlated with the surface area of the material.

The new method can be applied to catalysts such as used in cracking, reforming, desulfurization, denitrification, hydrocracking and dehydrogenation processes as well as to many high area adsorbents. Where the method is used for obtaining an indication of surface change, the value obtained need not be converting to true surface area. Rather, the amount of change as indicated by the change in the amount of air adsorbed from the previous measurement is proportional to the true surface area, and hence, this value can be used to control the operations in a way to offset the effect of surface area change.

Further, the method, can be used as an integral part of a catalyst manufacturing process to obtain superior results. Thus, in the manufacture of a catalyst where a high or a particular surface area is desired, samples are periodically taken, as in a slip stream, from the main body of this catalyst passing through or contained in the drying or calcining kiln. Surface areas as measured by the above-described rapid method can be used as a control: in response to decreases in surface area, the temperature, residence time and amount of water in the calcining atmosphere are severally or jointly decreased to offset the surface area decrease. That is, the temperature, residence time and water vapor pressure are varied in proportion to the surface area of the catalyst. Another variant is to introduce steam to reduce surface area to the controlled extent desired without changing the pore size in the catalyst. With the surface area method as a monitor, optimum catalyst manufacturing conditions can be maintained. Illustrative of the catalyst manufacturing methods in which the above method for controlling the surface area include the methods disclosed, for example in Patent 2,870,082.

The surface area measuring method can also be used as an integral part of a catalytic process of converting hydrocarbons. For example, in a fluid catalytic cracking process, such as for example, described in "Progress in Petroleum Technology," Advances in Chemistry Series V, pp. 30–38, American Chemical Society (1951), the silica-alumina catalyst particles desirably have a surface area of greater than 120 m.²/g. Loss of catalytic activity on aging is associated with loss of surface area. Slip stream sampling, or other suitable means of obtaining samples of catalyst after leaving the regenerator and ready for reintroduction into the reactor are measured for surface area by the above method. Catalyst surface area changes are rapidly detected by such method and can be translated to control proportionately the regenerator temperature. For example, where the surface area decreases, the regenerator temperature is decreased such as by reducing the heating of the feed or by reducing the proportion of the high coke forming portion of a blended feed.

Other applications include dehydrogenation with a catalyst and the preparation thereof as disclosed in Sieg Patent 2,943,067, which points out that the surface area is desirably within the range of 30–100 m.²/g.

Figure 3:
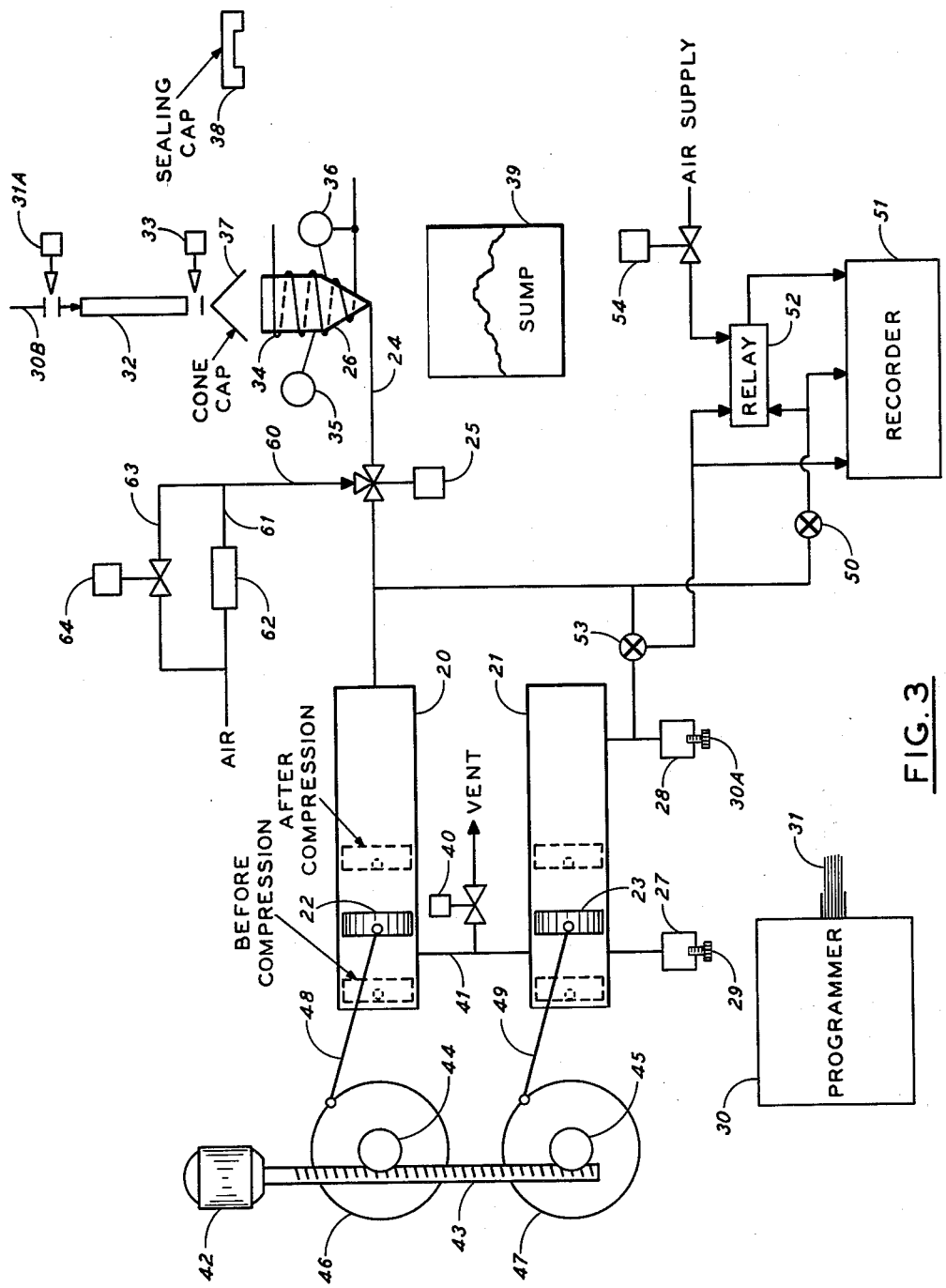
FIG. 3 is a schematic drawing of an automatic system for catalyst sampling obtaining a surface area indicating measurement and recording.
Figure 4:
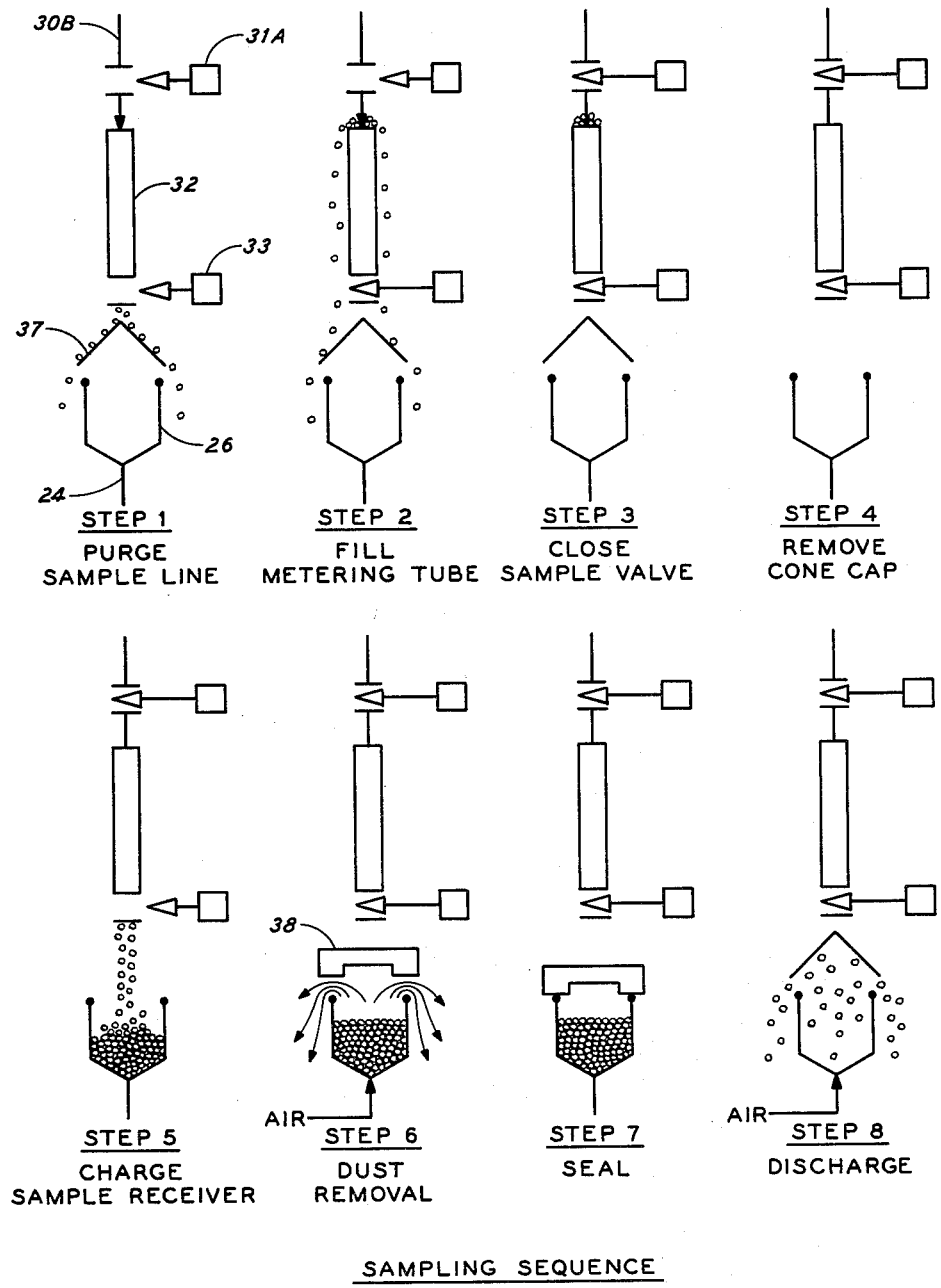
FIG. 4 is a drawing showing the sequence of operations in the sampling of the catalyst for the automatic system of FIG. 3.

To illustrate a system for automatically obtaining an indication of the surface area of a catalyst, either in a manufacturing process or in a hydrocarbon conversion process where catalyst surface area is an important factor, reference is made to FIGS. 3 and 4 of the drawings. Such a system employs two cylinders 20 and 21, equipped with leak-tight pistons 22 and 23. Cylinder 20 is connected by line 24 through a three-way valve 25 to a sample vessel 26. The pistons are arranged for simultaneous movement from a position of low pressure (usually atmospheric) to a position of higher pressure (usually of the order of twice the original pressure). The positions of the pistons before and after compression are shown in dashed lines in the drawings. Cylinder 21 is a reference cylinder whose effective volume is adjusted to equal the volume of cylinder 20 plus line 24 and the catalyst void volume in sample vessel 26 when sealed as described below. This adjustment to equality of volumes before and after compression is attained by means of the small chambers 27 and 28 fitted with adjusting screw plugs. In this adjustment a calibration solid equivalent to the skeletal volume of the metered amount of catalyst is placed in the sample vessel 26, thereby setting up the apparatus with a correction for the skeletal volume of the catalyst. The amount of air adsorbed by the catalyst, a quantity directly related to surface area, is found from the cylinder pressures after compression, in accordance with the expression:

$$A = \frac{P_d}{P_{A2} - P_i} K$$

wherein A is the surface area, $P_d$ is the difference in pressure between cylinders 20 and 21 after compression, $P_{A2}$ is the pressure in cylinder 20 after compression, $P_i$ is the initial pressure (usually atmospheric) in the cylinders 20 and 21, and K is a constant related to the particular type of catalyst.

The system, as described in more detail below, includes means for taking a metered sample of catalyst in dried condition from a catalyst manufacturing process, introducing said catalyst sample into, and sealing it in, sample vessel 26, a drive mechanism for moving pistons 22 and 23 to a compression position, sensing means to measure the pressure difference between the cylinders 20 and 21 as well as the final pressure in cylinder 20 in connection with the sealed vessel 26 containing the catalyst sample, computing means responsive to the pressure measurements to obtain the quotient of the pressure differential divided by said final pressure, and means for recording said quotient and preferably also the measured pressures. As indicated above, the quotient is proportional to the surface area of the catalyst. Included in the system is a programmer to actuate the mechanisms in proper sequence.

A catalyst sample line 30B, usually under pressure in connection with the main body of catalyst to be sampled, has a valve 31A which when open allows catalyst to discharge into metering tube 32 having an emptying valve 33 at its lower end. Sample receiver 26 directly below metering tube 32 may have an external heater 34 (shown schematically as a coil), a temperature indicator 35 and temperature controller 36, whereby the temperature of the catalyst and receiver can be kept the same for the measurements. The top opening of receiver 26 has both a cone cap 37 and a sealing cap which are moved by suitable actuating mechanism (not shown) into positions as will be explained below in connection with the description of the sampling procedure. A catalyst sump 39 may be provided as shown.

An air supply is joined to the three-way valve 25 through line 60 having a branch 61 with a flow restrictor 62 and another branch 63 with a valve 64 allowing full air flow when open.

With the metered sample collected and sealed in the sample receiver 26, as in step 7 explained below in connection with FIG. 4, and with pistons 22 and 23 at "before compression" position, a vent valve 40 in line 41 between cylinders 20 and 21 opens for a few seconds to equalize the pressure in the cylinders and then closes. (Valve 25 has also been put into position to provide communication from cylinder 20 to receiver 26.) A drive motor 42 working through worm drive 43, gears 44 and 45, wheels 46 and 47 and connecting rods 48 and 49, respectively, moves the pistons 22 and 23 to the "after compression" position.

Then the final pressure (i.e., $P_{A2}-P_i$; usually gauge pressure when the initial pressure is atmospheric) is measured by a transducer 50 and transmitted thereby, usually as a pneumatic signal, to both a multi-pen recorder 51 and a relay computer 52. Likewise, a transducer 53 measures the pressure differential, $P_d$, and transmits its signal to recorder 51 and relay computer 52. An air supply line 54 conventional for such pneumatic signal system is shown. The relay computer 52 may be, for example, a Minneapolis-Honeywell Sorteberg bridge divider, and obtains the quotient of $P_d$ divided by $P_{A2}-P_i$ and transmits a signal thereof to recorder 51. Such signal is proportional to the surface area and as such is suitable for surface area control either by the use of the proper scale on the recording paper in recorder 51 or by reference to a correlation curve for the type catalyst being tested. If desired, a proportioning relay (not shown) may be used to improve the correcting constant on the signal before it is recorded.

All the valves are provided with solenoids or other suitable actuating mechanisms. These as well as control for the drive motor 42 and the sample receiver caps actuating mechanisms are all suitably connected to programmer 30 through appropriate leads 31 (not fully shown) for operating in the proper sequence of catalyst sample taking, pressuring, measurement of pressure, depressuring, and discharge of sample as well as repetition of the cycle at the desired intervals.

Referring to FIG. 4, the cycle of operations begins with the sample receiver 26 empty, no flow in sample line 30, and the cone cap 37 sheltering the opening of receiver 26 so no catalyst can enter it. In step 1, sample line 30 is purged to obtain a current sample (i.e., representative of the active body of catalyst) by opening valves 31 and 33. Cone cap 37 deflects the catalyst flowing from the metering tube 32 into the sump 39. In step 2, the catalyst is collected in metering tube 32 by closing valve 33. The metering tube 32 is long and narrow, such as ¾-inch by 8 inches, and hence the slight variable volume in the pile of catalyst on the top of the tube can cause only small variations in the volume of sample collected.

In steps 3, 4 and 5, the catalyst sampling valve 31 is first closed, the cone cap 37 moved out of the way and valve 33 opened to allow the metered amount of catalyst in tube 32 to fall into sample receiver 26. In step 6 the the sealing cap 38 is positioned slightly above the opening of sample receiver 26. To remove dust from sealing lip of the receiver, a small flow of air is bled into the bottom of receiver 26 through line 24 and as shown in FIG. 3, three-way valve 25, line 60, and branch line 61 with the flow restrictor 62.

In step 7, the sealing cap 38 is pressed down into the lip of the receiver opening to seal the catalyst sample in the receiver. A temperature equalizing step follows (such as the order of 1 minute) to allow the catalyst and receiver 26 to reach the predetermined temperature for measurement conditions.

In some instances, instead of heating coil 34 around the catalyst sample receiver, a cooling coil may be provided, particularly where the catalyst is obtained at very high temperatures. However, excessive cooling which would cause adsorption of moisture should be avoided.

With the catalyst sample sealed in receiver 26 and at the desired temperature, communication between cylinder 20 and receiver 26 is established through line 24 and valve 25. Then the compression and measuring procedure described heretofore is carried out.

Thereafter, with the cylinders 20 and 21 back to atmospheric pressure, step 8 is carried out: the sealing cap 38 is removed and the cone cap 37 positioned above the opening of the receiver 26. Air flowing through opened valve 64 in full flow branch line 63 and thence through valve 25 and line 24 blows the catalyst upward against the inner side of the deflecting cone. With the receiver discharged of catalyst, the cycle is completed and the system is ready for a new test.

To illustrate the surface area indicating method of the present invention, a series of measurements were made. The apparatus used was that shown in FIG. 1. Each such instrument has an instrument correction, obtained, for example, by checking against a standard steel ball, which correction is applied to the actual counter reading to obtain the indicated volume. The correction for this instrument was −.12 cc.

*Example 1*

A sample of alumina after heating for 1 hour at 900° F. and cooled in a sealed bottle was placed in the tared instrument cup and weighed. The sample weight was 3.32 grams. The cup and weighed sample were placed in the sample cylinder 1 of the instrument, the cylinder closed and the pistons moved until the piston in the reference cylinder was against the stop and the pressure in the sample cylinder the same as indicated by the manometer. The apparent volume taken from the instrument reading, after deducting the instrument correction explained above, was 0.65 cc. The skeletal volume was then determined by the same procedure on a 7.84 g. sample of the same heat-treated alumina after immersion in a measured amount of water to block adsorption of air as follows: in this instance 10 cc. of water was carefully added to the measuring cup of the instrument so that the sample was completely wetted and immersed in water. The skeletal volume was obtained from the instrument reading after deducting for the instrument correction and the amount of water added, the volume obtained being 2.21 cc. From the difference between the skeletal volume per gram (2.21÷7.84=.282) and apparent volume per gram (0.65÷3.32=.196) is obtained the volume of adsorbed gas, which in this instance was .086 cc./g. This value is proportional to the surface area of the sample and can be related to BET type measurements by means of a correlation such as shown in FIG. 2. For the same material, the BET method gives a value of 103 m.$^2$/g.

*Example 2*

Other samples of the same catalyst as used in Example 1 were subjected to the same procedure, except that skeletal volumes were calculated from a skeletal density measurement of 3.54 g./cc. made by immersing a 7.84 g. sample in 10 cc. of water and attaining a volume of 2.21 cc. in the instrument. The following values were obtained:

| No. | Catalyst Weight (grams) | Apparent Volume (cc.) | Skeletal Volume (calc.) | Volume Adsorbed, cc. | Volume Adsorbed, cc./gram |
|---|---|---|---|---|---|
| A | 11.08 | 2.24 | 3.13 | .89 | .0803 |
| B | 17.34 | 3.53 | 4.90 | 1.37 | .0790 |
| C | 26.98 | 5.42 | 7.60 | 2.18 | .0808 |

*Example 3*

A series of samples of a calcined silica gel catalyst having a BET surface area of 297 m.$^2$/g. were measured also by the procedure of Example 2. Skeletal density as measured by the water immersion technique was 2.48. The values obtained were as follows:

| No. | Catalyst Weight (grams) | Apparent Volume (cc.) | Skeletal Volume (calc.) | Adsorbed Volume | Adsorbed, cc./gram |
|---|---|---|---|---|---|
| A | 1.63 | .10 | .66 | .56 | .0334 |
| B | 4.74 | .94 | 1.91 | .97 | .0205 |
| C | 10.32 | 1.88 | 4.17 | 2.29 | .0222 |
| D | 5.97 | 1.01 | 2.40 | 1.39 | .0233 |

*Example 4*

Samples of a silica-alumina with a BET surface area of 490 m.$^2$/g. were measured by the procedure of Example 2. The skeletal density was 2.11. The values obtained were as follows:

| No. | Catalyst Weight (grams) | Apparent Volume (cc.) | Skeletal Volume (calc.) | Adsorbed Volume | Adsorbed, cc./gram |
|---|---|---|---|---|---|
| A | 2.63 | -.38 | 1.24 | 1.62 | .615 |
| B | 5.91 | -.59 | 2.78 | 3.37 | .570 |
| C | 11.03 | -1.02 | 5.22 | 6.24 | .565 |

*Example 5*

Other samples of an alumina catalyst were subjected to the procedure used in Example 1. The samples were pretreated in various ways as indicated below. The measurements and values obtained are shown in the following table. The proportionality factor given in the last column was obtained by dividing the value for the volume adsorbed per gram by the volume for the BET area on the same sample.

| No. | Pretreatment Conditions | | | Catalyst Weight | Apparent Volume | Wet Volume | Skeletal Density | Volume Adsorbed (cc.) | Volume Adsorbed, cc./gram | BET Area, m.$^2$/g. | Proportionality Constant |
|---|---|---|---|---|---|---|---|---|---|---|---|
| | Atmos. | Temp. | Time (hrs.) | | | | | | | | |
| A | None | | None | 17.15 | -.33 | 4.71 | 3.64 | 5.04 | .294 | 244 | 1.20 |
| B | H$_2$ | 1,600° F. | 6 | 16.71 | 3.80 | 4.11 | 4.07 | .31 | .0185 | 23 | .80 |
| C | Steam | 1,500° F. | 4¾ | 19.55 | 1.98 | 5.36 | 3.65 | 3.38 | .190 | 125 | 1.52 |
| D | | do | 2¾ | 17.53 | 1.71 | 4.80 | 3.65 | 3.09 | .176 | 133 | 1.32 |
| E | | do | 2 | 16.41 | 1.11 | 4.48 | 3.67 | 3.37 | .205 | 150 | 1.37 |
| F | | do | ½ | 16.04 | 1.14 | 4.40 | 3.65 | 3.26 | .203 | 149 | 1.36 |
| G | | do | 1½ | 16.77 | 1.78 | 4.60 | 3.65 | 2.82 | .169 | 121 | 1.40 |

*Example 6*

A sample of dried alumina having a measured BET surface area of 291 m.$^2$/g. gave by the procedure of Example 1 above a gas adsorption of .3164 cc./g. From these values was obtained a proportionality factor of .92. Gas adsorption values were then determined in the same manner for three other samples of alumina and with the aid of a straight line relationship based upon the above proportionality factor, surface areas on the familiar BET terms were caluculated. The values obtained compared to actual BET surface area measurements are shown in the following table:

| Sample No. | Apparent Volume (cc./g.) | Skeletal Volume (cc./g.) | Volume Gas Adsorbed (cc./g.) | Area From Proportionality Factor, m.$^2$/g. | BET Surface Area |
|---|---|---|---|---|---|
| A | .1108 | .2720 | .161 | 148 | 143 |
| B | .1276 | .2850 | .157 | 145 | 123 |
| C | .1745 | .2955 | .112 | 112 | 104 |

*Example 7*

A series of silica gel and silica-alumina catalysts were soaked for one day in aqueous ammonium hydroxide solutions at various pH's indicated below. In each case, 20 g. of the catalyst and 250 cc. of the ammonium solution were used. Thereafter, the samples were dried for 2 hours at 400° F. and the areas of weighed portions of the dried samples were measured by the procedure of Example 1 above, the negative numbers being obtained for some apparent volumes by allowing for the known volume of a glass stripper introduced into the chamber with the sample. Samples A–D are silica-alumina catalysts and samples E–G are silica gel catalysts.

| Sample No. | Catalyst Weight (grams) | Apparent Volume (cc.) | Skeletal Volume by Water Immersion | Skeletal Density (g./cc.) | Volume Adsorbed (cc.) | Volume Adsorbed (cc./g.) | pH of Soaking Solution | Surface Area (m.$^2$/g.) | BET Surface Area (m.$^2$/g.) |
|---|---|---|---|---|---|---|---|---|---|
| A | 4.95 | -2.05 | 1.66 | 2.98 | 3.71 | .750 | 7.0 | 500 | 473 |
| B | 7.48 | -2.40 | 3.14 | 2.38 | 5.54 | .741 | 7.95 | 495 | 543 |
| C | 11.38 | -3.64 | 4.56 | 2.46 | 8.20 | .721 | 9.0 | 482 | 518 |
| D | 13.28 | 2.07 | 6.00 | 2.21 | 3.93 | .296 | 12.1 | 197 | 163 |
| E | 11.87 | -3.38 | 5.45 | 2.18 | 8.83 | .748 | 7.0 | 500 | 464 |
| F | 9.86 | -2.97 | 4.68 | 2.10 | 7.65 | .776 | 7.95 | 520 | 455 |
| G | 11.23 | -2.68 | 5.21 | 2.17 | 7.89 | .64 | 9.0 | 430 | 408 |

These two series of tests show that the method gives values of gas adsorbed in proportion to the surface area as measured by the BET method. With the aid of a relationship like that of FIG. 2 for the particular catalyst, BET surface areas can be estimated, as given in the penultimate column above. Further, the changes in the amount of gas adsorbed can be used directly to follow the changes in surface area as brought about by the treatment in the ammonium hydroxide solutions.

*Example 8*

A sample of a silica-alumina catalyst weighing 10.75 g. was measured by the procedure of Example 1 to give a volume of adsorbed gas of 7.09 cc. or .660 cc./g. With the known BET surface area of 473 m.²/g., the point was placed on the graph of FIG. 2 and a line drawn through this point to the origin. The alumina line in FIG. 2 was constructed from a like measurement to obtain a gas adsorption value of .212 cc./g. for an alumina having a BET surface area of 143 m.²/g. Other gas adsorption values for similar catalysts can be read off this line of the graph in terms of their BET surface areas. Similar curves can be constructed for other materials for use in connection with the values obtained in this method.

*Example 9*

The method was used to check on the possible change in surface areas of two batches of catalysts for which it was desired to have the surface area constant. Using the procedure of Example 1 above, a first sample of 15.041 g. of a silica-alumina catalyst prepared in a particular manner gave an apparent volume of —1.56 cc., a skeletal volume of 6.02 cc. and thus a gas adsorption of 7.58 cc., i.e., .504 cc./g. which, from the correlation curve for this catalyst preparation, indicates a surface area of 490 m.²/g. A second sample of 14.049 g. from another batch of catalyst prepared in the same manner gave an apparent volume of —1.00, a skeletal volume of 6.10, and thus a gas adsorption of 7.10 cc., i.e., .472 cc./g., which, from the same correlation curve, indicated a surface area of 460 m.²/g. From the lesser surface area indicated for the second sample, the manufacturing procedure can be changed to offset the trend toward lower surface areas. As will be noted, the samples used were practically of the same weight and hence, the skeletal volumes also substantially the same. Consequently, the lowered gas adsorption as shown by the change in the apparent volumes could be used directly, without conversion to true surface areas, for control in the manufacture procedure; this follows because the apparent volume as measured on a constant weight and skeletal volume basis is a function of the surface area.

While the skeletal volume and density of a sample is often most conveniently obtained by the water immersion technique as used in the examples above, a non-adsorbing gas, e.g., helium, can be used as described above for this purpose. In using helium or the like, it is important that the chambers be carefully flushed to displace any adsorbing gas before making the measurement with helium. Thus, in a test using helium on the alumina of Example 1, an abnormaly high value was obtained for the skeletal volume, thus indicating that the chamber had been insufficiently flushed so that some remaining air was present to give a false high reading.

What is claimed is:

1. In a catalyst manufacturing process having a heat treating step which substantially controls the surface area of the resulting catalyst, the improvement which comprises taking a series of substantially dried samples of the catalyst from the heat treating step, introducing each of said samples into a closed chamber, subjecting each of said samples in said chamber to a pressure of an adsorbing gas increased by a fixed amount and at a fixed temperature above the critical temperature of said gas, measuring the difference between the resulting volume of gas in said chamber and the gas volume obtainable under the same conditions with a nonadsorbing gas, which difference is proportional to the surface area of the catalyst, and then adjusting the temperature in the heat treating step in proportion to the change in said difference from the volume difference obtained in the same way for a previous sample whereby the surface area of said catalyst produced in the process is controlled.

2. In a catalyst manufacturing process having a heat treating step which substantially controls the surface area of the resulting catalyst, the improvement which comprises taking a series of substantially dried samples of the catalyst from the heat treating step, introducing each of said samples into a closed chamber, subjecting each of said samples at a fixed temperature in said chamber to a fixed volume of an adsorbing gas at a superatmospheric pressure and a temperature above the critical temperature of said gas, measuring the difference between the resulting pressure and the pressure obtainable under the same conditions with a nonadsorbing gas, which difference is proportional to the surface area of the catalyst and then adjusting the temperature in the heat treating step in proportion to the change in said pressure difference from the pressure difference obtained for the previous sample whereby the surface area of said catalyst produced in the process is controlled.

3. In a process for the manufacture of a catalyst with a controlled surface area, the improvement which comprises periodically taking samples of the catalyst in the course of the manufacturing process, and for each sample confining in a closed chamber a measured amount of said catalyst in a dried state at a fixed temperature, subjecting said sample in said chamber to a fixed increase in pressure of an adsorbing gas at a temperature above the critical temperature of said gas, and measuring the resulting apparent volume of gas in said chamber, which said apparent volume of gas is proportional to the surface area, and repeating for subsequent samples of catalyst taken from the manufacturing process the steps for obtaining the apparent volume of gas in said chamber under the same conditions, the changes in apparent gas volume showing the changes in surface area, and adjusting conditions in the manufacturing process in response to the changes in said apparent volume of gas, whereby the surface area of the catalyst produced in the process is controlled.

References Cited by the Examiner

UNITED STATES PATENTS

| | | | |
|---|---|---|---|
| 2,706,904 | 4/1955 | Hertel | 73—38 |
| 2,788,657 | 4/1957 | Innes | 73—38 |
| 2,921,033 | 1/1960 | Houdry | 252—449 |
| 3,033,799 | 5/1962 | Thomsen | 252—450 |

BENJAMIN HENKIN, *Primary Examiner.*

MAURICE A. BRINDISI, *Examiner.*

E. MEROS, *Assistant Examiner.*